United States Patent
Anthony

[15] 3,659,291
[45] Apr. 25, 1972

[54] AIRCRAFT NAVIGATION COMPUTER
[72] Inventor: Myron L. Anthony, La Grange, Ill.
[73] Assignees: Thomas E. Dorn, Clarendon Hill; Statistical Services, Inc., Chicago, Ill., part interest to each
[22] Filed: Aug. 18, 1969
[21] Appl. No.: 851,028

[52] U.S. Cl. .................................................343/6 R, 343/106 R
[51] Int. Cl. ......................................G01s 9/56, G01s 1/44
[58] Field of Search ........................................343/6 R, 106 R

[56] References Cited

UNITED STATES PATENTS 3,581,073  5/1971  Visher....................................343/6 R
3,495,241  2/1970  Perkins...................................343/6 X
3,534,399  10/1970  Hirsch..................................343/107 X Primary Examiner—T. H. Tubbesing
Attorney—Kinzer, Dorn and Zickert

[57] ABSTRACT

An all-electronic solid-state airborne analog computer, utilizing the navigation signals available from a VOR receiver and a DME receiver to develop linear coordinate signals continuously indicating the aircraft position and direction of movement relative to a ground station or to an arbitrarily selected waypoint within the operating range of the ground station.

14 Claims, 11 Drawing Figures

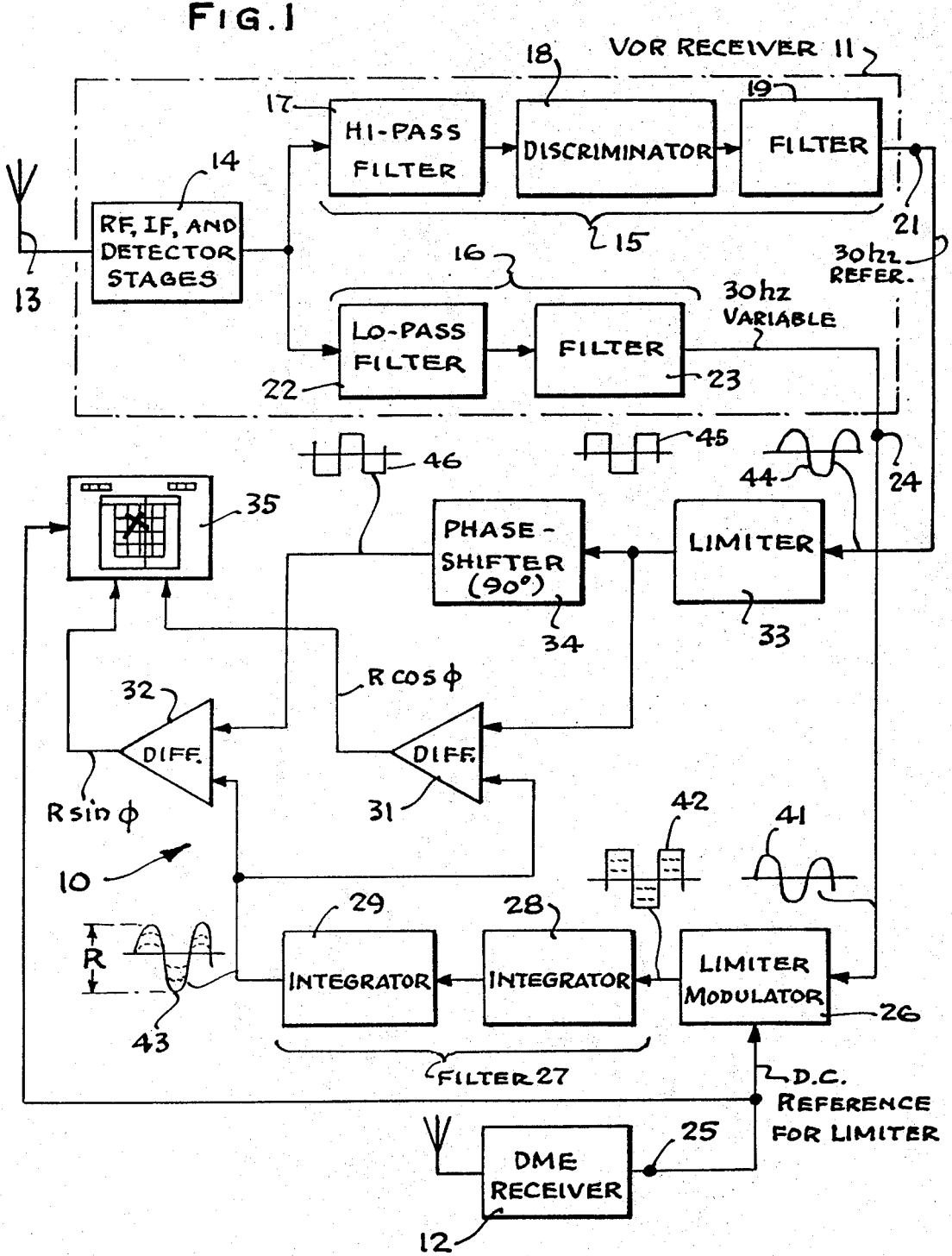

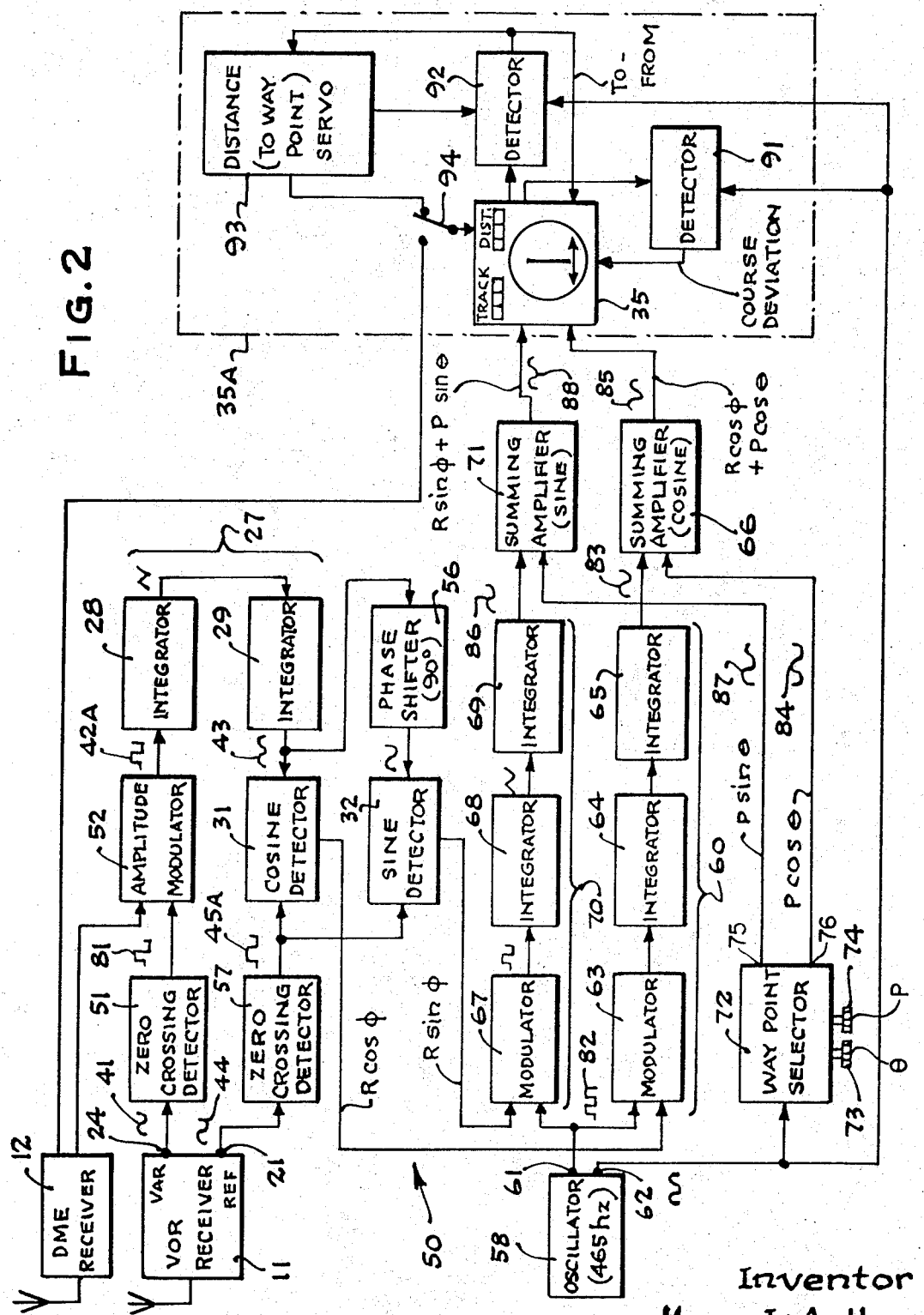

ZERO CROSSING
DETECTOR 51
(OR 57, 107)

CONSTANT SLEW
RATE FILTER
102 (OR 106)

AIRCRAFT NAVIGATION COMPUTER

CROSS REFERENCES TO RELATED APPLICATIONS

The computer of the present invention preferably is used in conjunction with a VOR receiver of the kind described and claimed in the co-pending application of Myron L. Anthony, Ser. No. 713,786, filed Mar. 18, 1968, now abandoned and superseded by application Ser. No. 54,778, filed July 14, 1970. The preferred forms of the computer employ constant slew rate circuits described and claimed in the co-pending application of Myron L. Anthony, Ser. No. 11,399, filed Feb. 16, 1970.

BACKGROUND OF THE INVENTION

In conventional aircraft navigation instrumentation, the bearing of the aircraft with respect to a given ground station transmitter (VORTAC) is determined by bearing signals received and interpreted by a VOR receiver, whereas the distance information pertinent to the position of the aircraft relative to the same ground station is derived from the distance signals developed by a DME receiver. The bearing and distance of the aircraft with respect to the ground station may be displayed on separate instruments. On the other hand, these two different types of information may be combined in a single situation display.

In recent years, increasing attention has been given to course line computers for combining the bearing and distance information in an integrated display to enable the pilot to determine more rapidly and conveniently the present location and movement of the aircraft with respect to the ground navigation station. A course line computer can be of substantial value in increasing the utility of existing ground facilities and in presenting the navigational position information to the pilot in a more effective manner than is possible with separate displays of bearing and distance information. Moreover, the course line computer makes it possible, in many instances, to select an arbitrary way point and to display bearing and distance information with respect to the waypoint instead of relative to the ground station. This capability makes it practical and convenient to fly multiple parallel paths that do not intersect the location of the ground station, increasing the air traffic that can be safely and effectively guided from an existing ground station by an order of magnitude.

But known course line computers have presented a number of difficulties in their construction and operation. In one known course line computer, as described in Perkins U.S. Pat. Nos. 2,801,051 and 3,034,724, resolution of the bearing and distance data into linear coordinate signals suitable for use in an effective integrated position display was achieved with the use of precision rotary DC potentiometers. That construction afforded an effective and accurate display only if the potentiometers were wound with extreme accuracy, an accuracy that proved difficult to achieve, and even more difficult to duplicate.

In more recent proposals for course line computers, particularly as described in Perkins and Anthony U.S. Pat. No. 3,414,901, AC resolvers have been utilized, instead of the earlier DC potentiometers, as a means for combining the distance and bearing data signals to develop usable linear coordinate signals. Resolver systems impose considerably less difficulty, in regard to precision manufacture and matching of components, when compared with DC potentiometers, but usually require relatively complex and expensive servo systems. Moreover, the resolvers must still be manufactured to relatively high precision standards and are also rather expensive. Furthermore, course line computers utilizing AC resolvers continue to present substantial technical problems with respect to the required intermodulation of distance and bearing data, particularly with respect to distortion of the bearing information.

SUMMARY OF THE INVENTION

It is a principal object of the invention to provide a new and improved analog position computer for an aircraft navigation system that is an all-electronic solid state device and that requires no rotary potentiometers or resolvers in its operation.

Another object of the invention is to provide a new and improved all-electronic solid state analog aircraft navigation position computer that effectively and inherently eliminates or minimizes the possibility of introduction of error in the computer operation.

Another object of the invention is to provide a new and improved all-electronic analog position computer for an aircraft navigation system that is substantially simpler and less expensive than digital computer apparatus but entails no effective loss in speed or accuracy.

A further object of the invention is to provide a new and improved solid state analog aircraft position computer that effectively modifies the bearing and distance data from a conventional ground station to enable the pilot to fly the aircraft on a given course relative to a waypoint that is entirely separate from the ground station.

Another object of the invention is to provide a new and improved solid state analog aircraft position computer that is capable of using raw VOR receiver data without the introduction of errors often introduced by conventional VOR detection systems.

A specific object of the invention is to provide a new and improved solid state aircraft navigation computer that is simple and inexpensive in construction, and requires a minimum of cockpit space.

Accordingly, the invention is directed to an analog solid-state position computer for use in an aircraft navigation system of the kind including a receiver for developing first and second data signals of given fixed frequency varying in phase angle $\phi$ relative to each other, in accordance with one position parameter, and a receiver for developing a third data signal representative of another position parameter, relative to a ground station transmitter. The computer comprises means for utilizing the first data signal to generate a first intermediate signal, at the given frequency, of substantially rectangular wave form. Modulating means are provided for amplitude modulating the second data signal in accordance with the third data signal to generate a second intermediate signal of amplitude R, at the given frequency, having a sinusoidal wave form. A first product detector multiplies the two intermediate signals together to generate a first ground station coordinate signal $R \cos \phi$. A second product detector multiplies the intermediate signals together, with one intermediate signal shifted 90° in phase, to generate a second ground station coordinate signal $R \sin \phi$.

DESCRIPTION OF THE DRAWINGS

FIG. 1 is a simplified block diagram of an analog aircraft navigation position computer constructed in accordance with one embodiment of the present invention;

FIG. 2 is a block diagram of a more complex embodiment of the present invention;

DESCRIPTION OF THE PREFERRED EMBODIMENTS

Figure 4:
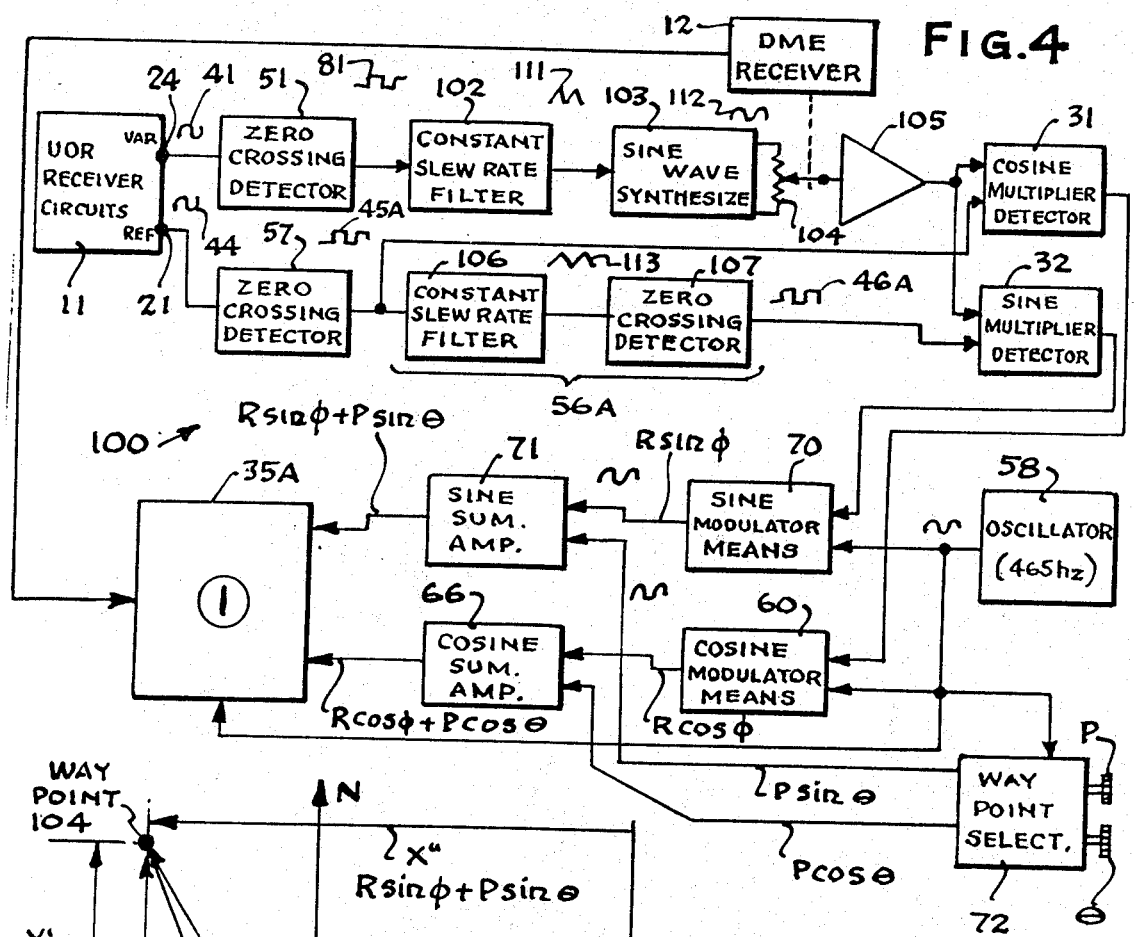
FIG. 4 is a block diagram of another embodiment of the invention.

FIG. 1 illustrates an all-electronic solid state analog aircraft navigation position computer 10 constructed in accordance with one embodiment of the present invention and utilizing the signals developed by a VOR receiver 11 and a DME receiver 12. It should be understood that the block diagram of FIG. 1 has been substantially simplified, in comparison to the overall circuitry of the computer and the two receivers, with only the fundamental operating circuits illustrated.

The VOR receiver 11, as shown in FIG. 1, may be of substantially conventional construction, preferably with the conventional output stage omitted. Receiver 11 includes an antenna 13 coupled to the initial stages 14 of the receiver, including the usual radio frequency, intermediate frequency, and detector stages. The output of circuit 14 is coupled to two signal channels 15 and 16 in receiver 11, channel 15 being the reference signal channel and channel 16 being the variable signal channel.

The reference signal channel 15 in receiver 11 may comprise a high-pass filter 17 having its output coupled to a discriminator 18. The output of discriminator 18 is in turn coupled to a filter 19. The output of filter 19, at terminal 21, is the constant-phase 30 hz. reference signal of the VOR receiver.

Signal channel 16 in receiver 11 comprises a low pass filter 22. The output of filter 22 is connected to a filter 23. The output of filter 23, at terminal 24, is the 30 hz. variable phase signal of the VOR receiver.

As noted above, receiver 11 may be entirely conventional in construction. It is much preferred, however, that the VOR receiver be constructed with integrating filters or other constant slew rate filters for the filter circuits 19 and 23, instead of the passive filters that have conventionally been used in receivers of this kind. Integrating filters make it possible to eliminate many of the errors that might otherwise be introduced in the receiver operation, due to the inherent amplitude sensitivity and phase shift of conventional passive filters. Moreover, discriminator 18 is preferably a product discriminator of the kind described in Anthony U.S. Pat. No. 3,024,419. Furthermore, it is most desirable to utilize electrical signal outputs from the VOR receiving circuits as the computer inputs, without resort to any output servo or other electromechanical output device. Preferred constructions for the circuits of the VOR receiver 11 are described in substantial detail in the aforementioned co-pending application of Myron L. Anthony, Ser. No. 713,786.

DME receiver 12 may be conventional in construction; the internal circuits of the DME receiver have not been shown in the drawing. The output of receiver 12, at terminal 25, is a DC signal that varies in amplitude in accordance with the distance of the aircraft from the ground station transmitter to which receiver 12 is tuned.

In computer 10, the variable bearing data signal from output terminal 24 of VOR receiver 11 is coupled to one input of a limiter-modulator circuit 26. Modulator 26 also has a second input that is connected to the output 25 of the DME receiver 12. The output of modulator 26 is coupled to a filter 27 comprising a first integrator 28 and a second integrator 29 connected in series with each other. The output of filter 27 is coupled to one input of a first product detector comprising a differential amplifier 31. The output of filter 27 is also connected to one input of a second product detector comprising a differential amplifier 32.

The reference signal from output terminal 21 of VOR receiver 11 is connected, in computer 10, to the input of a limiter or other square wave signal generator circuit 33. The output of limiter 33 is connected to a second input of the differential amplifier 31. The output of limiter 33 is also connected to the input of a phase shift circuit 34. Phase shifter 34, which has a phase shift of 90° at 30 hz., is connected to a second input for the second product detector comprising differential amplifier 32. The outputs of the two differential amplifiers 31 and 32 are both connected to a display device 35.

In operation, signals received at antenna 13 of VOR receiver 11 are supplied to the preliminary receiver stages 14. In stages 14, the received signals are amplified and detected in the usual manner, producing an output signal that is supplied to both of the signal channels 15 and 16 in the receiver. In channel 15, the high-pass filter 17 effectively eliminates the low-frequency components of the signal and supplies discriminator 18 with an input signal restricted substantially to the 9,960 hz. subcarrier signal. Discriminator 18 functions to develop, from the subcarrier signal, a 30 hz. constant phase reference signal, from which extraneous noise is eliminated in filter 19. Thus, the 30 hz. reference signal is supplied from output terminal 31 of receiver 11 to the input of limiter 33 in computer 10.

In channel 16, low-pass filter 22 effectively restricts the signal supplied to filter 23 to the 30 hz. variable bearing data signal. Extraneous noise is removed from the signal in filter 23 and the 30 hz. variable phase signal is supplied from output terminal 24 to limiter-modulator 26 in computer 10.

The bearing data signal supplied to limiter-modulator 26 develops a square wave output signal 42 having an amplitude that varies in accordance with the input signal from receiver 12. Moreover, the phase of signal 42 varies in accordance with the variations in the phase of the input signal 41 from receiver 11.

In filter 27, the square wave signal 42 is integrated twice, producing an output signal 43 of sinusoidal wave form. The dual integration does not change the phase or amplitude of signal 43, as compared with signal 42. Thus, signal 43, which is supplied to the two product detectors comprising differential amplifiers 31 and 32, varies in amplitude R in accordance with the distance signal from receiver 12, and varies in phase in accordance with the variable phase signal from receiver 11.

The input signal to limiter 33, taken from output terminal 21 of receiver 11, is a sine wave signal 44. In limiter 33, which may comprise a conventional clipping amplifier, the reference 30 hz. signal 44 is converted to a square wave signal 45; signal 45 is supplied to one input of differential amplifier 31 and also to the input of phase shifter 34. The output of the phase shifter is a signal 46 of rectangular wave form having the same frequency as signal 45, but with a phase delay of 90°.

Amplifier 31 operates as a product detector with respect to the two input signals 43 and 45 supplied thereto. The output of amplifier 31 is a DC signal which can be shown to have an amplitude and polarity that varies with changes in the amplitude R of the sinusoidal input signal 43 and with changes in the cosine of the phase angle $\phi$ of the square wave input signal 45. Similarly, amplifier 32 functions as a product detector with respect to its two input signals 43 and 46. The output signal from amplifier 32 is a DC signal having an amplitude R sin $\phi$. It will be recognized that the two output signals R cos $\phi$ and R sin $\phi$ of the two products detectors 31 and 32, respectively, are linear coordinate signals that fully define the position of the aircraft with respect to the ground station as regards both bearing and distance. These two signals are supplied to the display device 35 to actuate the display and afford to the pilot a continuous indication of his position relative to the ground station. Display device 35 may be substantially conventional in construction; for example, a Sperry RD–100 radio direction indicator, with the usual auxiliary equipment, may be employed.

From the foregoing description, it will be seen that computer 10 is an all-electronic solid state analog computer that requires no servos, precision potentiometers, resolvers, or other similar electro-mechanical components. The computer, when constructed with integrated circuits and other solid state devices, is extremely small in size and occupies a minimum of space. In fact, it can be readily fabricated as the output stage of a VOR receiver with no need for enlargement of the receiver housing. On the other hand, high accuracy is easily achieved in computer 10, and there is little or no opportunity to introduce distortion into the linear coordinate signals developed by the computer. The product detectors 31 and 32 are of substantial value in preventing distortion in operation of the computer. Moreover, the computer components are relatively inexpensive, particularly in comparison with a digital computer or with a conventional analog computer capable of performing comparable operations and based upon servos, potentiometers, resolvers, or like electromechanical components.

FIG. 2 illustrates a somewhat more sophisticated analog computer 50 constructed in accordance with another embodiment of the invention. In computer 50, the output terminal 24 of the VOR receiver apparatus 11 is connected to the input of a zero crossing detector 51. The output of circuit 51 is connected to one input of an amplitude modulator 52. Modulator 52 has a second input connection from the output terminal 25 of the DME receiver 12. Modulator 52 is a gated chopper circuit, the output from detector 51 being connected to the gate control and the DC signal from receiver 12 constituting the signal that is chopped.

The output of modulator 52 is connected to the input of an integrator 28 which is in turn connected to a second integrator 29 in a filter circuit 27. The output of the integrator 29 is connected to a cosine detector 31. The output of integrator 29 is also connected to a phase shifter circuit 56 having its output connected to a sine detector 32. Each of the two detectors 31 and 32 is a differential amplifier functioning as a product detector as described above in connection with FIG. 1.

The reference output terminal 21 of receiver 11 is connected to the input of a zero crossing detector 57. The output of detector 57 is connected to a second input for product detector 31. The output of circuit 57 is also connected to a second input for product detector 32.

Computer 50 (FIG. 2) further comprises an oscillator 58 operating at a relatively low frequency, a frequency that is not harmonically related to the 30 hz. signals of VOR receiver 11 or to the power supply frequency of the aircraft. Assuming that the power supply of the aircraft operates at a nominal 400 hz., as is usually the case, the frequency for oscillator 58 may be selected as 465 hz. as indicated in FIG. 2, although other frequencies can be used as desired. Oscillator 58 has two output terminals 61 and 62. Terminal 61 provides an output signal of rectangular wave form and terminal 62 produces a corresponding frequency and phase but of sinusoidal wave form.

The output terminal 61 of oscillator 58 is connected to one input of a modulator means 60 comprising an initial modulator circuit 63, which may comprise a field-effect transistor chopper circuit. Modulator 63 has a second input connection taken from the output of the cosine product detector 31. The output of modulator 63 is supplied to an integrator 64 which is in turn coupled to a second integrator 65, both included in modulator means 60. The output of second integrator 65 is connected to one input of a summing amplifier 66.

The square wave output terminal 61 of oscillator 58 is also connected to one input of a second modulator means 70 comprising a chopper-modulator 67 having a second input taken from the output of the sine product detector 32. The output of modulator 67 is connected to the input of an integrator 68 which is in turn coupled to the input of a second integrator 69, both included in modulator means 70. The output of integrator 69 is connected to one input of a summing amplifier 71.

Computer 50 further includes a way point selector 72. Way point selector 72 has an input circuit connected to the sinusoidal signal output terminal 62 of oscillator 68. The way point selector has two manual adjustment devices, a bearing adjustment 73 and a distance adjustment 74. Way point selector 72, which is discussed in greater detail hereinafter, produces two output signals $P \sin \theta$ and $P \cos \theta$, determined by the settings of the distance and bearing adjustments 73 and 74, these signals appearing at the output terminals 75 and 76 respectively. The output signal $P \sin \theta$ from terminal 75 is supplied to a second input of the summing amplifier 71. The way point signal $P \cos \theta$ from terminal 76 is supplied to the second input of summing amplifier 66. The outputs of the two summing amplifiers 66 and 71 are connected to a display apparatus 35A illustrated as including a display instrument 35, a track deviation detector 91, a to-from detector 92, and a waypoint servo mechanism 93.

Figure 7:
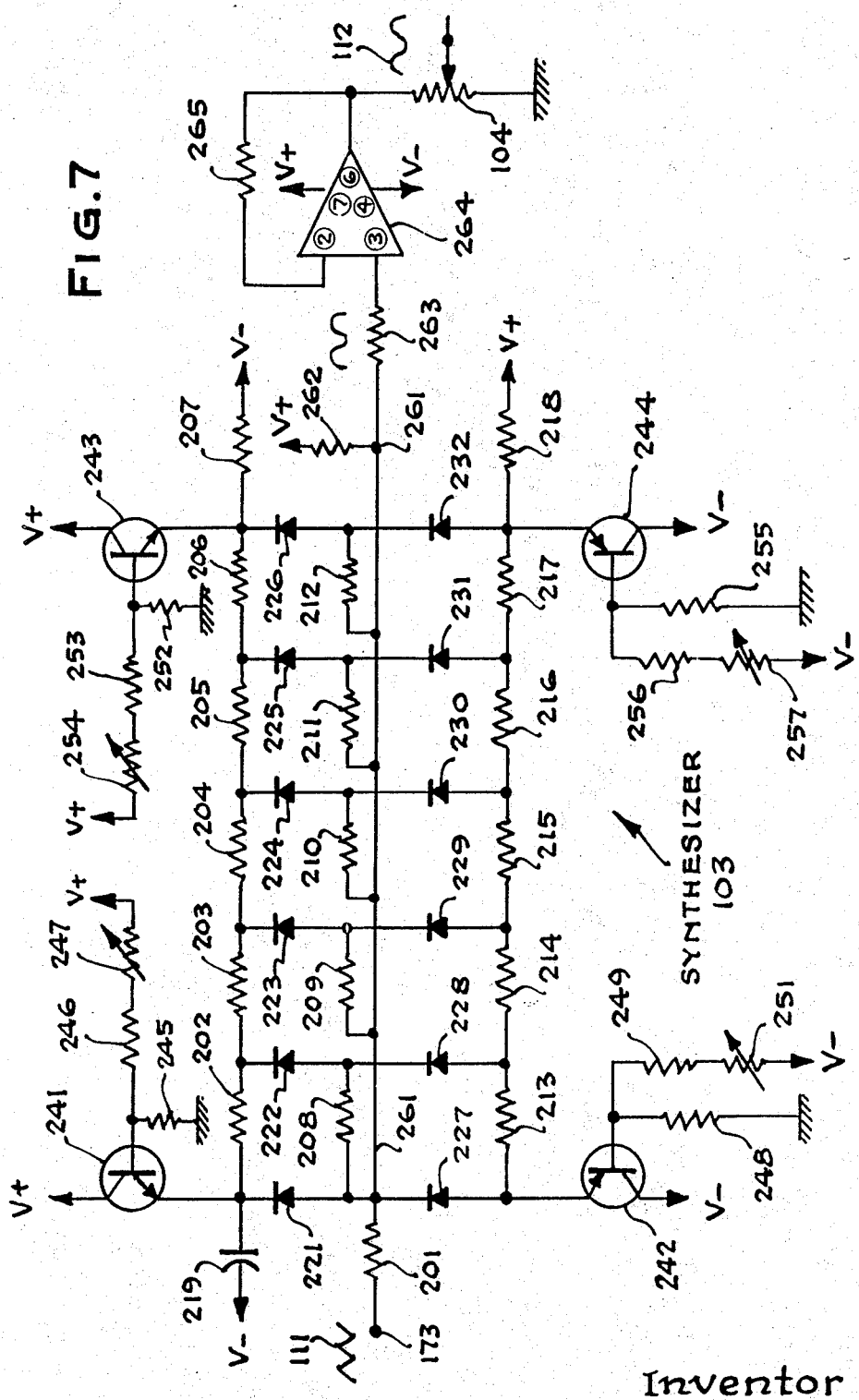

It will be recognized that devices 91–93 correspond to conventional auxiliary equipment for display device 35; the servo 93 corresponds to the output servo apparatus of a DME receiver. The distance data connection from servo apparatus 93 to display device 35 includes a switch 94 that can connect the display device to DME receiver 12 instead of the way point servo. Detectors 91 and 92 each have an input connection from oscillator 58. In a preferred construction, a constant slew rate filter of the kind discussed hereinafter in connection with FIGS. 4 and 7, is interposed in the course deviation control circuit between detector 91 and display device 35.

The overall operation of computer 50 (FIG. 2) is somewhat similar to that of computer 10 (FIG. 1) but there are some substantial differences in the two computers; furthermore, computer 50 provides for the introduction of way point information not employed in computer 10. The sinusoidal variable phase 30 hz. signal 41 derived from output terminal 24 of VOR receiver 11 is converted to a corresponding signal of rectangular wave form by the zero crossing detector 51. This square wave signal 81 is modulated in amplitude in modulator 52, producing an output signal 42A having the essential characteristics of signal 42 as described above in connection with FIG. 1. As before, signal 42A is integrated twice, in circuits 28 and 29, producing a sinusoidal intermediate signal 43A having a frequency and phase corresponding to that of the variable phase signal from the VOR receiver, but having an amplitude determined by the distance signal from the DME receiver. That is, the signal 43A appearing at the output of integrator 29 has an amplitude R corresponding to the amplitude of the DME signal and corresponds to the signal 43 developed in computer 10.

The constant phase reference signal 44 from VOR receiver terminal 21 is converted to a square wave intermediate signal 45A by the zero crossing detector 57. Signal 45A corresponds in all essential respects to signal 45 of the previously described embodiment, the only difference being the type of circuit employed to generate the square wave signal.

The two product detectors 31 and 32 function as before to develop linear coordinate signals $R \cos \phi$ and $R \sin \phi$ respectively. The first coordinate signal $R \cos \phi$ is supplied to modulator 63 and the second coordinate signal $R \sin \phi$ is supplied to modulator 67. In modulator 63, the first coordinate signal $R \cos \phi$ is employed to modulate the amplitude of the 465 hz. square wave signal 82 from oscillator 58. The output signal from modulator 63 is of rectangular wave form; it is integrated in circuit 64 to produce a signal of triangular wave form and is further integrated in circuit 65 to produce a signal 83 of sinusoidal wave form that is one of the input signals to summing amplifier 66. The other input signal to amplifier 66 is the sinusoidal way point coordinate signal 84 of amplitude $P \cos \theta$ from terminal 76 of way point selector 72. In amplifier 66, the two input signals 83 and 84 are algebraically added, producing a sinusoidal position signal 85, $R \cos \phi + P \cos \theta$. This is a linear coordinate signal relating the present position of the aircraft to the way point selected by way point selector 72, but based upon the navigation signals received by receivers 11 and 12, and is supplied to display device 35 in apparatus 35A.

The other coordinate signal for display apparatus 35A is developed in the same manner. The DC output signal $R \sin \phi$ from detector 32 is employed, in modulator 67, to modulate the amplitude of the square wave signal 82 from oscillator 58. The modulated signal is twice integrated to produce a sinusoidal ground station coordinate signal 86 that is supplied to one input of summing amplifier 71. In amplifier 71, signal 86 is algebraically added with the way point signal 87 from way point selector 72, producing a position signal 88 having an amplitude $R \sin \phi + P \sin \theta$. This second position signal 88 is supplied to display device 35 to control operation of the display conjointly with the first position signal 85.

In display apparatus 35A, detector 91 receives an output signal from the internal resolver apparatus (not shown) of device 35 and utilizes that signal to control a track deviation pointer in the display device. Detector 92 receives another output signal from the same internal apparatus in device 35 and, in conjunction with servo apparatus 93, controls the distance-to-go indicator of the display device, showing the distance to the selected way point as long as switch 94 is in the illustrated position. Detector 92 also actuates a to-from indicator (not shown) in display device 35 to inform the pilot whether he is flying toward or away from the selected waypoint. It will be recognized that the internal construction of the display apparatus has been substantially simplified because the mechanism and appropriate operating circuits are well known in the art.

Figure 3:
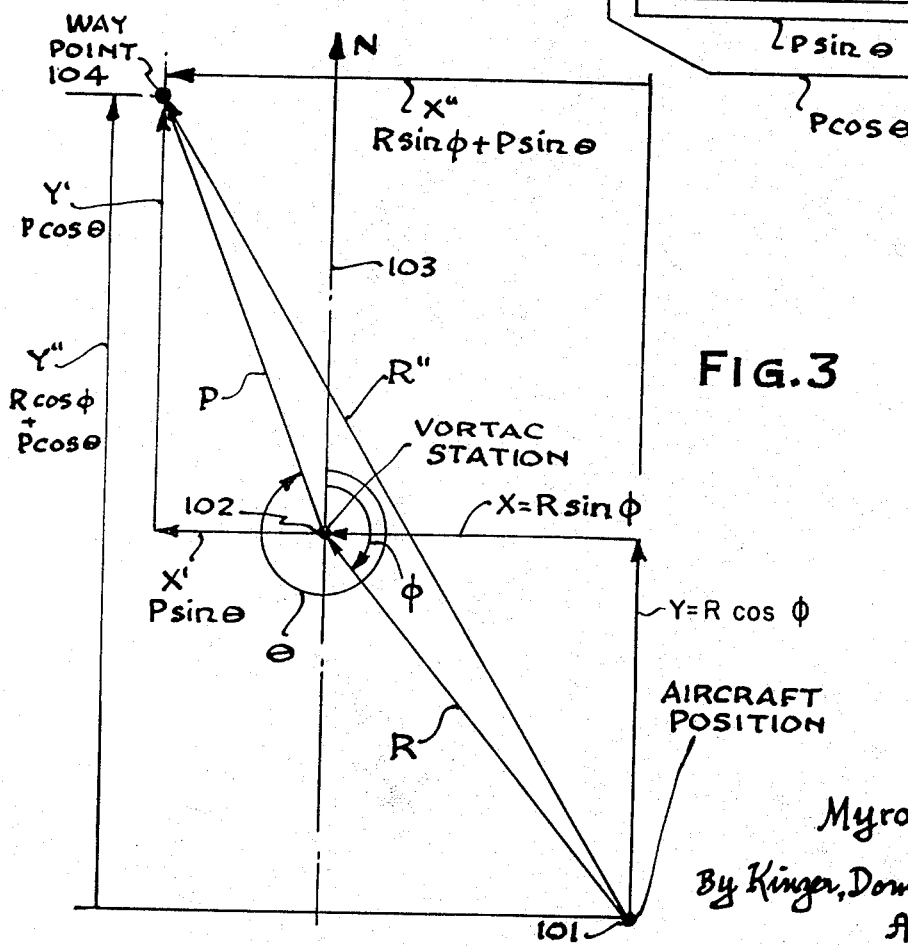
FIG. 3 is a diagram illustrating the operation of the computer of FIG. 2 in a given flight situation.

The functional significance of the operations performed in computer 50 in relation to the actual operation of an aircraft is illustrated in FIG. 3. In FIG. 3, the present position of an aircraft is indicated at point 101. The aircraft receives signals from a VORTAC (or TACAN) station located at point 102, the geographical orientation of the VORTAC station being indicated by phantom line 103 showing the direction of magnetic north and south. The aircraft is to proceed from position 101 to a waypoint 104, which may be an intermediate point on an extended flight or may constitute the terminus of the flight.

The direct path between aircraft position 101 and VORTAC station 102 is indicated in FIG. 3 by line R. Information as to the distance R is derived, in the aircraft, from the DME signals radiated by station 102 and detected in the DME receiver 12 (FIG. 2). That is, the output of the DME receiver is a signal representative of the distance R but gives no indication of the angular orientation of the flight path that this distance represents. The bearing of the aircraft relative to station 102 is indicated by the angle $\phi$ in FIG. 3. This bearing information is derived, in the aircraft, by the VOR receiver circuits 11 and is represented by the phase displacement between signals 41 and 44 (FIG. 2).

From FIG. 3, it will be seen that the flight path R to the station 102 can be represented by two linear coordinates X and Y, where $$X = R \sin \phi$$
$$Y = R \cos \phi$$

From the foregoing description, however, it will be apparent that these two linear coordinates correspond to the output signals of the initial computer portion of computer 50. That is, the Y coordinate is represented by the output signal from circuit 31 and the X coordinate finds its counterpart in the output signal from circuit 32. Moreover, the same coordinate signals are represented by the outputs 83 and 86 of integrators 65 and 69 respectively, following modulation with the signal from oscillator 58.

The path from station 102 to waypoint 104, in FIG. 3, is represented by the line P. Again, this path can be represented by two linear coordinates $X'$ and $Y'$, $$X' = P \sin \theta$$
$$Y' = P \cos \theta.$$

In the computer of FIG. 2, it will be seen that these two linear coordinates are present as the output signals 84 and 87 from the waypoint selector 72. Moreover, like the output signals 83 and 86 from modulator means 60 and 70, the waypoint coordinate signals 84 and 87 are modulated with the signal from oscillator 58.

In FIG. 3, the path from the present aircraft position at point 101 to the waypoint 104 is represented by line R''. It will be immediately apparent that this path can also be represented by two linear coordinates, $$X'' = R \sin \phi + P \sin \theta$$
$$Y'' = R \cos \phi + P \cos \theta.$$

That is, the one linear coordinate $X''$ is the sum of the linear coordinates X and $X'$ and the other linear coordinate $Y''$ is the sum of the coordinates Y and $Y'$. But this is precisely the significance of the two output signals 85 and 88 from the summing amplifiers 66 and 71 in the computer. Thus, the coordinate signals supplied to display device 35 in the computer of FIG. 2 are directly representative of the linear coordinates of the flight path $R''$ required for the aircraft to travel directly from its present position 101 to the waypoint 104 in FIG. 3.

FIG. 4 illustrates another solid state analog computer system 100, constructed in accordance with the invention, that is generally similar to the system 50 of FIG. 2 but affords some improved performance in the preliminary computation circuits. Computer system 100 includes the initial VOR receiver circuits 11 with the variable output terminal 24 (signal 41) again connected to a zero crossing detector 51 and the reference output terminal 21 (signal 44) connected to a zero crossing detector circuit 57. The output signal 81 of circuit 51 is connected to the input of a constant slew rate or constant slope filter 102. Filter 102 is a feedback amplifier circuit incorporating a capacitor that is charged at a constant rate at all times, as long as the amplitude of the input signal is maintained above a given minimum amplitude, producing an output signal 111 of triangular waveform. Furthermore, this constant slew rate filter circuit affords a fixed phase shift, so that no phase errors are introduced in the computer circuit. A specific example of an appropriate filter circuit is described hereinafter; see FIG. 6.

The output of filter 102 is applied to a sine wave synthesizer circuit 103 to convert the triangular waveform signal 111 to a sinusoidal signal 112. Synthesizer 103 is, essentially, a series of diode-controlled voltage dividers in a plural emitter-follower circuit, capable of producing an output signal of clean sine wave configuration in response to an input signal of triangular waveform. A specific example of circuit 103 is described in connection with FIG. 7.

The output of synthesizer circuit 103 is supplied to a potentiometer 104. The tap on potentiometer 104 is connected to the output shaft of the DME receiver 12 so that the amplitude of the output signal derived from the potentiometer tap is a function of the distance data developed by the DME receiver. The tap on potentiometer 104 is electrically connected to the input of an amplifier 105 and the output of amplifier 105 is coupled to one input of the cosine multiplier detector 31 and to one input of the sine multiplier detector 32.

The output of zero crossing detector 57 (signal 45A) is connected to the second input of detector 31, as in the previously described embodiment. The output of detector 57 is also connected to the input of a 90° phase shift circuit 56A having its output connected to the second input of detector 32. Phase shifter circuit 56A is shown as comprising an input circuit constituting a constant slew rate filter 106 and an output circuit comprising a zero crossing detector 107. It can be demonstrated that the filter can be operated to produce a phase shift of 90° as required for operation of sine detector 32.

The remainder of FIG. 4 is essentially similar to the system of FIG. 2. It includes the two modulator means 60 and 70 connected to the outputs of detectors 31 and 32 respectively. Modulator means 60 and 70 may be of the type described above in connection with FIG. 2, or may constitute any other solid-state circuit capable of converting the D.C. outputs of detectors 31 and 32 to appropriate sinusoidal signals. The outputs of the two modulator means 60 and 70, each of which has a secondary input from local oscillator 58, are connected to the cosine summing amplifier 66 and to the sine summing amplifier 71, respectively. Amplifier 71 receives a second input signal $p \sin \theta$, from the waypoint selector 72. Amplifier 66 receives a second input signal, $p \cos \theta$, from the waypoint selector 72. The outputs of the summing amplifiers are each connected to display apparatus 35A; the remaining connections for the display apparatus may be as illustrated in FIG. 2.

Because the operation of computer 100 is essentially similar to the systems described above, only a relatively brief description is necessary. The variable phase 30 hz. data signal appearing at output terminal 24 of the VOR receiver circuit unit 11 is applied to zero crossing detector 51 to produce an output signal 81 of rectangular waveform. Signal 81 is supplied to the input of the constant slew rate filter 102, producing an output signal 111 of triangular waveform that is supplied to the diode sine wave synthesizer circuit 103. The output of circuit 103 is a sine wave signal 112 that is applied to the potentiometer 104. The position of the tap on potentiometer 104 is varied in accordance with the mechanical output of DME receiver 12, supplying a signal to amplifier 105 that has a phase and frequency determined by the variable VOR data signal and an amplitude determined by the DME data signal. This signal is applied to the cosine multiplier detector 31 where it is multiplied by the VOR reference signal that has been converted to rectangular waveform in zero crossing detector 57 (signal 45A). The output from multiplier 31 is a DC signal having an amplitude and polarity representative of the vector distance $R \cos \phi$ (see FIG. 3).

The square wave constant-phase VOR reference signal 45A from the output of circuit 57 is also supplied to the constant slew rate filter 106, which produces an output signal 113 of triangular waveform that is shifted 90° in phase relative to the input signal. The triangular waveform signal 113 is applied to the zero crossing detector 107 to produce an output signal 46A of rectangular waveform. Signal 46A is supplied to one input of the sine multiplier detector circuit 32, the other input of detector 32 receiving the sinusoidal output signal from amplifier 105. The output from detector 32 is a DC signal having an amplitude and polarity representative of the vector coordinate distance $R \sin \phi$ (FIG. 3).

The DC output signals from detectors 31 and 32 are supplied to the cosine modulator means 60 and to the sine modulator means 70, respectively. The locally generated carrier signal from oscillator 58 is also supplied to the modulator means 60 and 70. The output of modulator means 60 is a signal of sinusoidal waveform having an amplitude and phase representative of the vector distance $R \cos \phi$. The output of modulator means 70 is a sinusoidal signal having an amplitude and phase representative of the coordinate vector distance $R \sin \phi$.

Waypoint selector 72, in FIG. 4, functions as in the circuit of FIG. 2 to produce two output signals $P \cos \theta$ and $P \sin \theta$, both at the local carrier frequency of 465 hz. The waypoint vector signal $P \sin \theta$ is supplied to the summing amplifier 71 together with the output signal from modulator means 70, producing a waypoint coordinate signal $R \sin \phi + P \sin \theta$ that is supplied to the display apparatus 35A. Similarly, the waypoint vector signal $P \cos \theta$ is supplied to the summing amplifier 66 along with the output signal from modulator means 60, producing a waypoint coordinate signal $R \cos \phi + P \cos \theta$ that is supplied to the display apparatus 35A.

Figure 5:
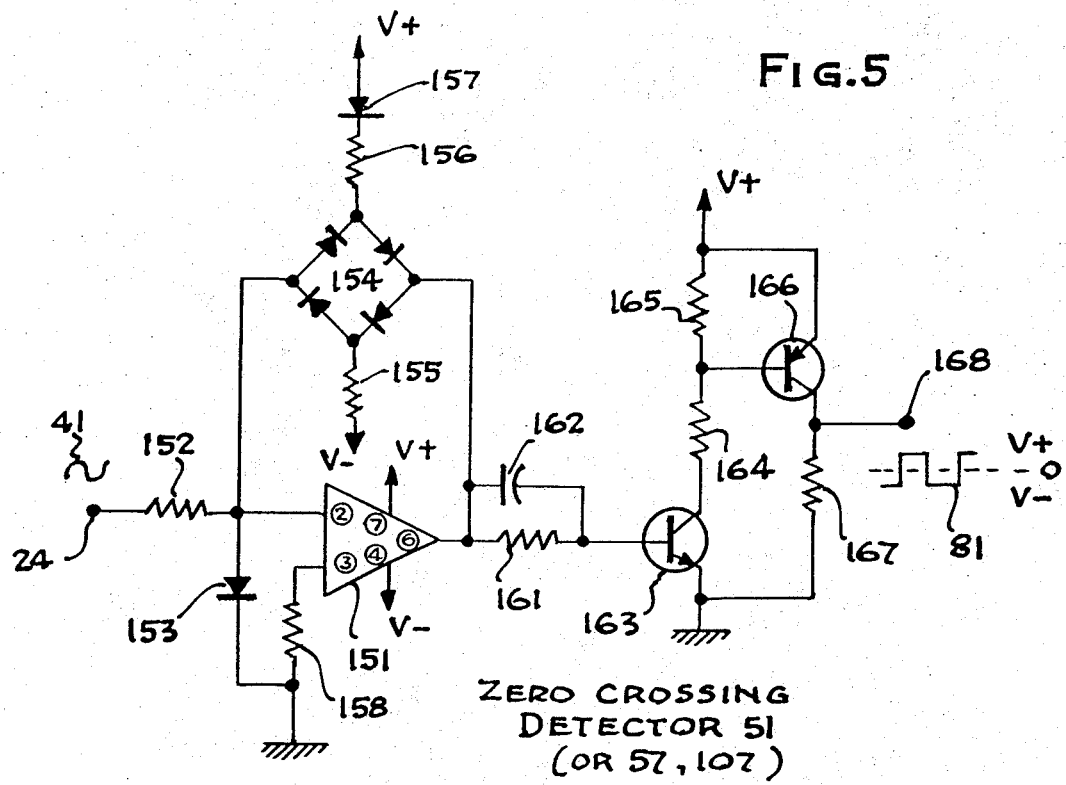
FIGS. 5, 6, 7 and 8 illustrate individual operating circuits usable in the embodiment of FIG. 4.

FIG. 5 illustrates, in schematic form, a typical zero crossing detector that may be used as circuit 51 in computer 100 (FIG. 4). The circuit illustrated in FIG. 5 is also appropriate for use as the circuit 57 or the circuit 107 of FIG. 4.

Referring to FIG. 5, the zero crossing detector illustrated therein comprises an operational amplifier 151 having its inverting input terminal connected through a resistor 152 to a source of a sinusoidal signal, shown in FIG. 5 as the output terminal 24 of the VOR receiver unit. The inverting input terminal of operational amplifier 151 is also returned to ground through a diode 153 and is connected to one terminal of a diode bridge 154. The opposite terminal of the diode bridge is connected to the output terminal of operational amplifier 151. One intermediate terminal of the diode bridge is connected through a resistor 155 to a negative power supply designated as V−. The remaining terminal of the diode bridge is connected through a resistor 156 and a diode 157 to a positive power supply designated as V+.

The non-inverting input terminal of the operational amplifier 151 is connected to ground through a resistor 158. The two power supply terminals of the operational amplifier are connected to the V+ and V− supplies. The output terminal of the operational amplifier is connected through the parallel combination of a resistor 161 and a capacitor 162 to the base electrode of a transistor 163.

The emitter of transistor 163 is connected to system ground. The collector of transistor 163 is connected through the series combination of a resistor 164 and a resistor 165 to the V+ supply. The common terminal of resistors 164 and 165 is connected to the base of a second transistor 166. The emitter of transistor 166 is connected to the V+ supply and the collector is connected through a resistor 167 to system ground. The output terminal 168 for the circuit is connected to the collector of transistor 166.

When the sinusoidal signal 41 is applied to the input terminal 24 of the zero crossing detector, as illustrated in FIG. 5, the output signal appearing at terminal 168 is the square wave signal 81 having a peak positive amplitude of V+ and a peak negative amplitude of V−, the square wave signal being centered around zero. Substantial variations in amplitude of the input signal 41 can be tolerated by the circuit with no variation in the amplitude of the output signal 81. Furthermore, zero crossing detector 51, as shown in FIG. 5 does not introduce any perceptible phase shift in the output signal as compared with the input signal. This characteristic is maintained despite variations in the power supply and other environmental factors. Thus, one of the major sources of difficulty in aircraft radio navigation systems, the introduction of errors in the receiver and signal processing apparatus, is effectively eliminated insofar as this circuit is concerned.

Figure 6:
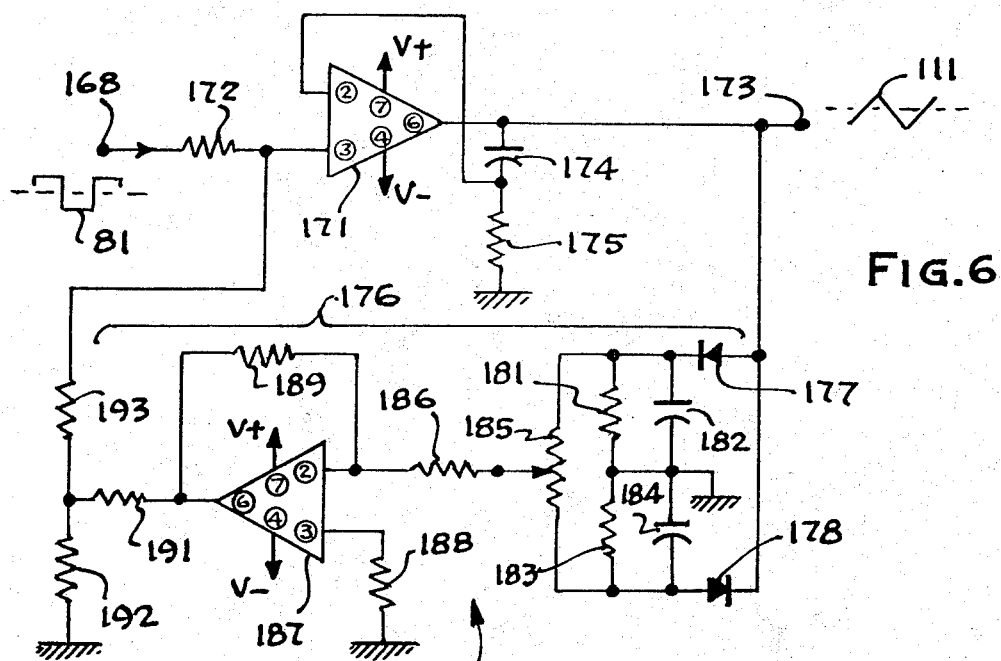

FIG. 6 illustrates a constant slew rate filter circuit that may be utilized as the filter 102 in the system of FIG. 4. By the same token, the circuit shown in FIG. 6 can be employed as the filter 106 in the system of FIG. 4.

The constant slew rate filter 102, as illustrated in FIG. 6, comprises an operational amplifier 171 having its non-inverting input terminal connected through a resistor 172 to the output terminal 168 of the preceding stage of the computer (see FIG. 5). The power supply terminals of operational amplifier 171 are connected to the V+ and V− supplies. The output terminal 173 of the operational amplifier, which is also the output terminal for the complete filter circuit, is connected to a capacitor 174 that is in turn connected to system ground through a small resistor 175. The common terminal of capacitor 174 and resistor 175 is connected back to the inverting input of operational amplifier 171.

The output terminal 173 of operational amplifier 171 is also connected back to the non-inverting input of the operational amplifier 171 by a DC and low-frequency stabilizing feedback circuit 176. Feedback circuit 176 includes a pair of oppositely-oriented diodes 177 and 178 connected to output terminal 173. Diode 177 is returned to system ground through a parallel RC circuit comprising a resistor 181 and a capacitor 182. Similarly, diode 178 is returned to ground through a parallel combination of a resistor 183 and a capacitor 184. In addition, diodes 177 and 178 are connected to the end terminals of a potentiometer 185.

The tap on potentiometer 185 is connected to a resistor 186 that is connected to the inverting input terminal of an operational amplifier 187. The power supply terminals of the operating amplifier 187 are connected to the V+ and V− supplies, respectively. The non-inverting input terminal to operational amplifier 187 is connected to ground through a resistor 188. The output terminal of operational amplifier 187 is connected through a feedback resistor 189 to the inverting input of the amplifier.

The output of operational amplifier 187 is connected to a resistor 191 that is in turn connected to the center terminal of a voltage divider comprising a resistor 192 that is connected to system ground and a resistor 193 that is connected back to the non-inverting input of operational amplifier 171.

The basic operation of the constant slew rate filter circuit illustrated in FIG. 6 can be most easily considered by initially avoiding reference to the stabilization feedback circuit 176. A reference voltage (of either polarity) applied to the input terminal 168 of the filter circuit is amplified and appears, without change of polarity, at the output terminal 173. This voltage charges capacitor 174 through the low resistance afforded by resistor 175. The voltage drop across resistor 175, which is a function of the charging current through capacitor 174, is fed back to the inverting input terminal of the operational amplifier 171. The output voltage of amplifier 171 will be such that the voltage across resistor 175 precisely matches the input voltage.

With constant voltage drop across resistance 175, the charging rate of capacitor 174 is a straight line function. That is, the charging rate of capacitor 174 has a constant slope, so that the circuit may be considered to have a constant "slewing rate". The actual slewing rate is determined by the impedance of capacitor 174 and resistor 175 and the amplitude of the input voltage. The direction of the slope of the charging characteristic for capacitor 174 depends, of course, on the polarity of the input signal. Furthermore, it can be demonstrated that the phase shift of the circuit is precisely 90° at any frequency above a given cut-off or corner frequency determined by the impedances of the circuit, particularly capacitor 174 and resistor 175.

The basic constant slope or constant slew rate filter, as thus far operationally described, is not stabilized for DC excitation. Consequently, there is a tendency for the output voltage at terminal 173 to drift up to the value of V+ or down to V−, depending upon variations in the DC content in the input signal and other factors. This characteristic can also produce fluctuations, at extremely low frequencies, in the output signal 111. The DC stabilization feedback circuit 176, which can be varied considerably from the form shown, prevents this DC drift.

FIG. 7 illustrates one form of sine wave synthesizer that may be utilized as the circuit 103 in the system of FIG. 4. In FIG. 7, the input terminal 173, which is the output terminal for the preceding constant slew rate filter, is connected to a resistor 201 that is in turn connected to an output terminal 261. The remaining components of the synthesizer are all connected to output terminal 261.

Thus, output terminal 261 is connected through a diode 221 to a series of precision resistors 202, 203, 204, 205 and 206, with resistor 206 being connected through a resistor 207 to the V− supply. Output terminal 261 is also connected through the series combination of a resistor 208 and a diode 222 to the common terminal of resistors 202 and 203, through a resistor 209 and a diode 223 to the common terminal of resistors 203 and 204, through a resistor 210 and a diode 224 to the common terminal of resistors 204 and 205, through a resistor 211 and a diode 225 to the common terminal of resistors 205 and 206, and through a resistor 212 and a diode 226 to the common terminal of resistors 206 and 207. The lower half of the synthesizer comprises a diode 227 that connects the output terminal 261 to a series of precision resistors 213, 214, 215, 216 and 217, resistor 217 being connected through a resistor 218 to the V+ supply. The junctions of the resistors in this series 213–217 are connected to the resistors 208, 209, 210, 211 and 212 by individual diodes 228, 229, 230 and 231 and 232 respectively.

Diode 221, in addition to its connection to resistor 202, is connected to the emitter of a transistor 241 and to a blocking capacitor 219 that is returned to the V− supply. The collector of transistor 241 is connected to the V+ power supply. The base of the transistor is connected to system ground through a resistor 245 and is also connected to the V+ supply through the series combination of a resistor 246 and a variable resistor 247. Similarly, diode 227 is connected to the emitter of a transistor 242. The collector of transistor 242 is connected to the V− supply and the base of the transistor is connected to ground through a resistor 248 and to the V− supply through the series combination of a resistor 249 and a variable resistor 251.

At the right-hand side of the synthesizer circuit of FIG. 7, diode 226 is connected to the emitter of a transistor 243 having its collector connected to the V+ supply. The base of transistor 243 is connected to ground through a resistor 252 and is connected to the V+ supply through a resistor 253 and a variable resistor 254. Similarly, diode 232 is connected to the emitter of a transistor 244 having its collector connected to the V− supply. The base of transistor 244 is connected to ground through a resistor 255 and is also connected to the V− supply through the series combination of a resistor 256 and a variable resistor 257.

Output terminal 261 is also connected to the V+ supply through a resistor 262. In addition, the output terminal is connected to a resistor 263 in turn connected to the non-inverting input of an operational amplifier 264. The power supply terminals of operational amplifier 264 are connected to the V+ and V− supplies. The output terminal of operational amplifier 264 is connected to the DME-controlled potentiometer 104, which is returned to system ground. In addition, the output terminal of the operational amplifier is connected to a feedback resistor 265 that is returned to the inverting input of the amplifier.

Synthesizer 103, as illustrated in FIG. 7, is a generally known circuit that has been utilized in test equipment; accordingly, no detailed operational description for the synthesizer is provided herein. Using selected resistors of appropriately graduated size, and with an adequate number of stages as illustrated in FIG. 7, the synthesizer circuit produces a sine wave output signal 112, having virtually no harmonic distortion, from the triangular waveform input signal 111.

Figure 8:
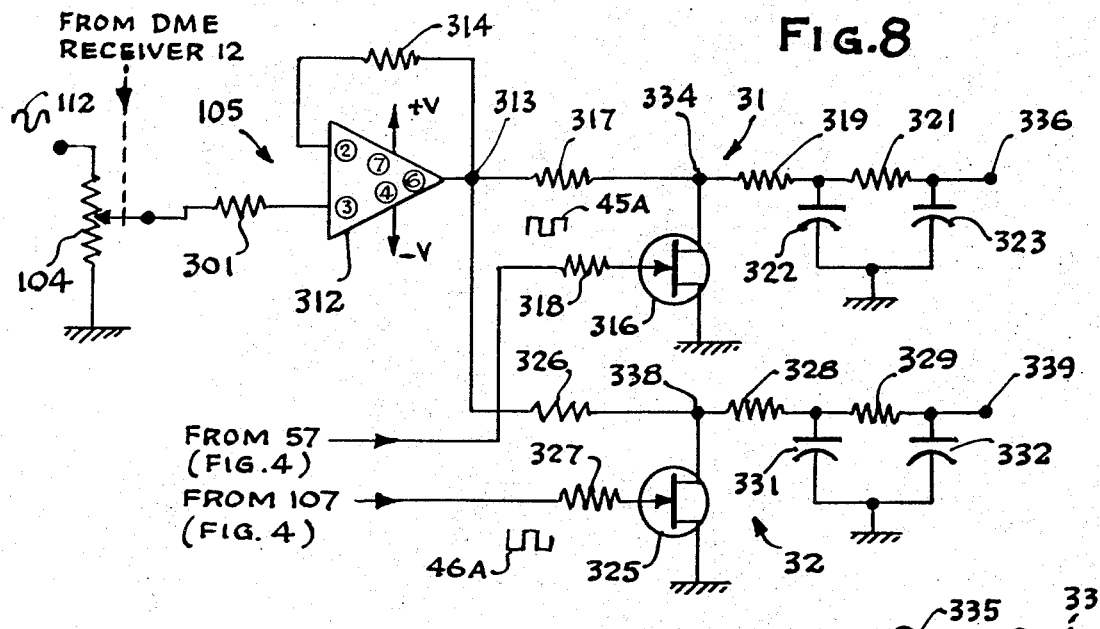

FIG. 8 illustrates specific circuits that may be utilized for amplifier 105, cosine multiplier detector 31, and sine multiplier detector 32 in the computer system of FIG. 4. At the left-hand side of FIG. 8, the DME-actuated potentiometer 104 is shown, the tap on the potentiometer being connected through a resistor 301 to the non-inverting input of an operational amplifier 312. The power supply terminals of the operational amplifier are connected to the V+ and V− supplies in the usual manner. The output terminal 313 of the operational amplifier is connected to a feedback resistor 314 that is in turn connected to the inverting input of the amplifier.

The circuit for the cosine multiplier detector 31 that is illustrated in FIG. 8 is, essentially, a field-effect transistor chopper. It comprises a field effect transistor 316 having one main electrode connected to system ground and having the other main electrode connected to a resistor 317 that is connected to the output terminal 313 of amplifier 105. The gate electrode of transistor 316 is connected to a resistor 318 in a circuit that extends back to the zero crossing detector 57 in the reference signal channel of the receiver (see FIG. 4). The output circuit of the cosine multiplier detector 31, as shown in FIG. 8, comprises a conventional low-pass filter including two series resistors 319 and 321 and two shunt capacitors 322 and 323.

The circuit illustrated in FIG. 8 for the sine multiplier detector 32 is essentially the same as for the cosine detector 31. It includes a field-effect transistor 325 having one main electrode connected to system ground; the other main electrode is connected to system ground; the other main electrode is connected to a resistor 326 that is connected back to the output terminal 313 of amplifier 105. The second input to the detector comprises a resistor 327 connected from zero crossing detector 107 (FIG. 4) to the gate electrode of transistor 325. The output of detector 32 is a low pass filter comprising two series resistors 328 and 329 and two shunt capacitors 331 and 332.

The operation of amplifier 105 is quite conventional and need not be described in detail. It supplies a sinusoidal signal to the field-effect transistor chopper circuit of detector 31, transistor 316 being gated on and off in alternate half cycles of the square wave input signal 45A from zero crossing detector 57. The output signal is a pulsating DC signal having a polarity that varies in accordance with the phase relationship between signals 45A and 112 and having an amplitude determined by the amplitude of signal 112. The waveform of the signal appearing at chopper terminal 334 is indicated by the solid line waveform 335 in FIG. 8A, for conditions in which the phase angle between the two input signals 45A and 112 is zero degrees. The output signal appearing at terminal 336 is represented by the dash line signal 337, in FIG. 8A, for the same operating conditions.

Figure 8A:
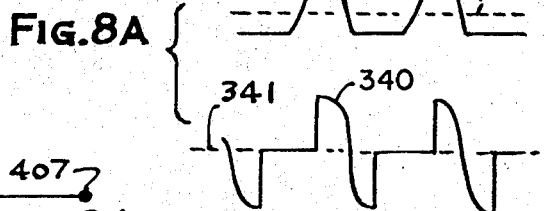
FIG. 8A illustrates the output signals from the circuit of FIG. 8.

The operation of the sine multiplier detector 32 of FIG. 8A is the same as described above for detector 31. The solid line waveform 340 in FIG. 8A represents the signal developed at the chopper terminal 338 for circuit conditions corresponding to a phase difference of 90° between the input signals 112 and 46A. The average of the positive and negative excursions of the signal 340 is zero so that, for these circuit conditions, the output signal at terminal 339 is zero as indicated by the dash line trace 341 in FIG. 8A. It will be seen that the output signals 337 and 341 change in amplitude and in polarity as with changes in the relative phase angles of the two input signals to each detector; signals 337 and 341 also vary in amplitude with changes in the amplitude of the sinusoidal input signal 112.

Figure 9:
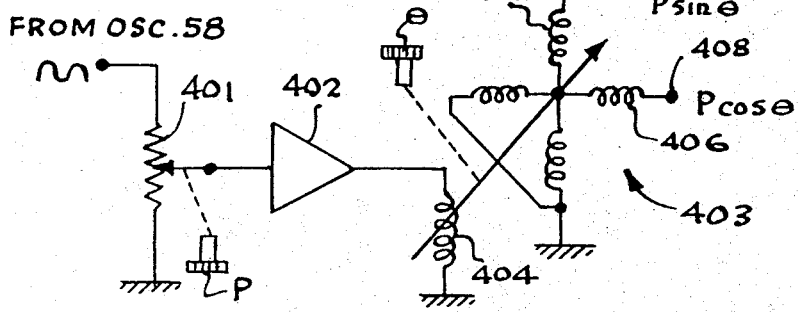
FIGS. 9 and 10 illustrate additional circuits that may be used in the system of FIG. 4.

FIG. 9 illustrates one apparatus that can be utilized for the waypoint selector 72. It includes an input potentiometer 401 having one terminal connected to the oscillator 58 (FIG. 4) and the other terminal returned to system ground. The position of the tap on potentiometer 401 is adjusted to vary the amplitude of the output signal from the tap to correspond to the distance P from the ground station to the selected waypoint (see FIG. 3).

The tap on potentiometer 401 is connected to the input of an amplifier 402 and the output of an amplifier 402 is connected to the input winding 404 of a rotary resolver 403. Resolver 403 includes two orthagonal output windings 405 and 406 connected in a conventional arrangement and having output terminal 407 and 408 respectively. The angular orientation between resolver input winding 404 and the output windings 405 and 406 is manually adjusted to correspond to the bearing angle $\theta$ for the waypoint (see FIG. 3).

In operation, the 465 hz. signal from oscillator 58 is adjusted in amplitude by potentiometer 401 and in phase by resolver 403. In this way, two output signals are produced, at terminals 407 and 408, of the form $P \sin \theta$ and $P \cos \theta$, respectively. It should be understood that this construction for waypoint selector 72 is presented only in the interest of completeness of disclosure and that other appropriate waypoint signal generating devices, such as multi-tap adjustable transformers, can be employed with the computer of the present invention in the generation of waypoint coordinate signals.

Figure 10:
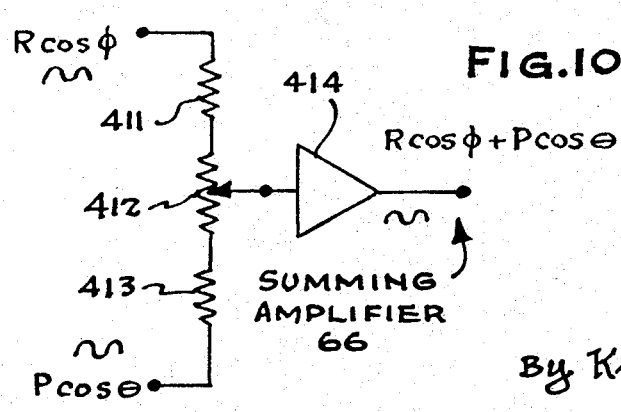

FIG. 10 illustrates an appropriate summing amplifier that may be used for the amplifier circuit 66 or for the amplifier circuit 71 in FIG. 4. As shown in FIG. 10, the sinusoidal ground station coordinate signal $R \cos \phi$ is applied to one end of a circuit comprising a resistor 411, a potentiometer 412, and a resistor 413 all connected in series with each other. The other end of this same circuit is supplied with the sinusoidal waypoint coordinate signal $P \cos \theta$. The tap on potentiometer 412 is connected to the input of an amplifier 414 and the output signal is of the form $R \cos \phi + P \cos \theta$.

In order to afford a more complete illustration of the invention, certain circuit parameters are set forth in detailed tabular form hereinafter. It should be understood that this information is presented solely by way of example and in no sense as a limitation of the invention.

RESISTORS

| | |
|---|---|
| 152,155,158,164 | 4.7 kilohms |
| 156,167,188,247,251,254,257 | 10 kilohms |
| 161 | 560 ohms |
| 165,252,255 | 2.2 kilohms |
| 172,181,183 | 150 kilohms |
| 175,192 | 100 ohms |
| 185,318,327 | 1 megohm |
| 186,189,262 | 47 kilohms |
| 191,193,201,246,249,253,256 | 1 kilohm |
| 202,213 | 51.1 ohms |
| 203,214 | 80.6 ohms |
| 204,215 | 137 ohms |
| 205,216 | 178 ohms |
| 206,217 | 280 ohms |
| 207,218 | 2 kilohms |
| 245,248 | 150 ohms |
| 263,265,301,314 | 33 kilohms |
| 317,326 | 100 kilohms |
| 208 | 432 ohms |
| 209 | 1370 ohms |
| 210 | 1780 ohms |
| 211 | 4530 ohms |
| 212 | 6650 ohms |
| 319,328 | 500 ohms |
| 321,329 | 5 kilohms |

CAPACITORS

| | |
|---|---|
| 162 | 0.1 microfarads |
| 174 | 1 microfarad |
| 182,184 | 4 microfarad |
| 219 | 3.3 microfarads |

Semi-Conductor Devices

| | |
|---|---|
| 151,171,187,264,312 | uA741 |
| 153,154,157 | 1N914 |
| 163,241,243 | 2N2222 |
| 166,242,244 | 2N2907 |
| 177,178 | 1N270 |
| 221 through 232 | 1N916B |
| 316,325 | 2N4222 |

Voltage Supplies

| | |
|---|---|
| V+ | +12 volts |
| V− | −12 volts |

I claim:

1. In an aircraft navigation system including receiver means for developing first and second data signals of given frequency varying in phase angle $\phi$ relative to each other, in accordance with one position parameter, and a third data signal representative of another position parameter, relative to a ground station transmitter, an all-electronic solid state analog position computer comprising:

means utilizing said first data signal to generate a first intermediate signal, at said given frequency, of substantially rectangular wave form;

modulating means for amplitude modulating said second data signal in accordance with said third data signal to generate a second intermediate signal of amplitude $R$, at said given frequency, having a substantially sinusoidal wave form;

a first product detector for multiplying said intermediate signals together to generate a first ground station coordinate signal $R \cos \phi$;

and a second product detector for multiplying said intermediate signals together, with one intermediate signal shifted 90° in phase, to generate a second ground station coordinate signal $R \sin \phi$.

2. An aircraft navigation position computer according to claim 1 in which said modulating means comprises a square wave signal generator, driven by said second data signal to control the frequency and phase of its output and driven by said third data signal to control the amplitude of its output, and two successive integrator stages coupled to the output of said square wave signal generator to convert its square wave output to said second intermediate signal.

3. An aircraft navigation position computer according to claim 2 in which said square wave signal generator includes a zero crossing detector actuated by said second data signal and a gated chopper circuit having its chopping rate controlled by the output of said zero crossing detector and further having its amplitude controlled by said third data signal.

4. An aircraft navigation position computer according to claim 1 in which said modulating means for generating said second intermediate signal comprises, in series, a zero crossing detector, driven by said second data signal, for generating a square wave signal corresponding in frequency and phase to said second data signal;

a constant slew rate filter for converting said square wave signal to a signal of triangular wave form;

a sine wave synthesizer for converting said signal of triangular wave form to a sinusoidal signal of constant amplitude;

and a variable output circuit for said sine wave synthesizer, continuously varied in accordance with said third data signal.

5. An aircraft navigation position computer according to claim 1 in which said means for generating said first intermediate signal is a zero crossing detector actuated by said first data signal, said computer further including phase shifting means comprising a constant slew rate filter driven by said first intermediate signal and a zero crossing detector actuated by the output of said filter to afford a phase shift of 90° in said first intermediate signal for utilization in said second product detector.

6. An aircraft navigation position computer according to claim 1 and further comprising:

a waypoint selector for generating first and second waypoint coordinate signals $P \cos \theta$ and $P \sin \theta$ representative of the location of a selected waypoint relative to the ground station;

a first summing amplifier for algebraically combining said first ground station coordinate signal and said first waypoint coordinate signal to develop a first linear coordinate position signal $R \cos \phi + P \cos \theta$; and a second summing amplifier for algebraically combining said second ground station coordinate signal and said second waypoint coordinate signal to develop a second linear coordinate position signal $R \sin \phi + P \sin \theta$.

7. An aircraft navigation position computer according to claim 6 in which said waypoint selector is actuated by a carrier signal from a local oscillator and develops waypoint coordinate signals of sinusoidal waveform at a given low carrier frequency;

said computer comprising sine modulating means and cosine modulating means for modulating said ground station coordinate signals with said carrier signal to produce ground station coordinate signals of sinusoidal waveform prior to combination of said ground station coordinate signals with said waypoint coordinate signals in said summing amplifiers.

8. An aircraft navigation position computer according to claim 7 in which said carrier signal, as applied to said sine and cosine modulating means, is of rectangular wave form, in which said further modulating means includes two signal channels, each comprising an amplitude modulator for modulating said square wave carrier signal with one of said ground station coordinate signals, followed by two successive integrators for developing said ground station coordinate signals of sinusoidal waveform.

9. The method of generating a continuous, precise trigonometric function signal based upon data signals of given frequency having a phase displacement $\phi$, relative to each other, that is representative of the function angle, comprising:

processing one data signal to develop a first intermediate signal, at said given frequency, of relatively pure sinusoidal waveform;

squaring the other data signal to develop a second intermediate signal, at said given frequency, having a fast rise-time waveform of essentially rectangular configuration;

chopping the first intermediate signal with the second intermediate signal to produce a pulsating DC signal having an amplitude proportional to the cosine of the phase angle between said data signals;

and filtering said pulsating DC signal to develop a steady DC output signal having an amplitude continuously representative of said phase angle $\phi$.

10. The method of generating a pair of continuous, precise sine and cosine function signals based upon first and second data signals of given frequency having a phase displacement $\phi$, relative to each other, that is representative of a function angle, comprising:

processing the first data signal to develop a first intermediate signal, at said given frequency, of relatively pure sinusoidal waveform;

squaring the second data signal to develop a second intermediate signal, at said given frequency, having a fast rise-time waveform of essentially rectangular configuration;

shifting the phase of the second intermediate signal by 90° and re-squaring to develop a third intermediate signal, at said given frequency, having a fast rise-time waveform of essentially rectangular configuration and in phase quadrature with said second intermediate signal;

chopping the first intermediate signal with the second intermediate signal and the third intermediate signal, in separate chopping circuits, to produce two pulsating DC signals, one having an amplitude proportional to the cosine of the phase angle between the first and second data signals and the other being an amplitude proportional to the sine of the phase angle between data signals;

and filtering said pulsating DC signals to develop steady DC output signals having amplitudes continuously representative of the cosine and sine, respectively, of said phase angle $\phi$.

11. The method aircraft navigation, entailing conversion of navigation data from polar to rectilinear coordinates, using first and second AC data signals of given frequency having a phase displacement $\phi$, relative to each other, that is representative of the polar coordinate angle, and a third data signal comprising a DC signal having an amplitude R proportional to the polar coordinate vector length, comprising:

squaring the first data signal;

chopping the third data signal with the squared first data signal to produce a variable amplitude signal of amplitude R, at said given frequency, of essentially rectangular waveform;

filtering the variable amplitude signal to develop a first intermediate signal, at said given frequency, of relatively pure sinusoidal waveform;

squaring the second data signal to develop a second intermediate signal, at said given frequency, having a fast rise-time waveform of essentially rectangular configuration;

chopping the first intermediate signal with the second intermediate signal to produce a pulsating DC signal having an amplitude proportional to $R \cos \phi$:

and filtering said pulsating DC signal to develop a steady DC coordinate signal $Y = R \cos \phi$.

12. The method of aircraft navigation, according to claim 11, and further comprising:

phase-shifting the second data signal, and then re-squaring, to develop a third intermediate signal, at said given frequency, of essentially rectangular waveform, in phase guadrature to said second intermediate signal;

chopping the first intermediate signal with the third intermediate signal to produce a second pulsating DC signal having an amplitude proportional to $R \sin \phi$;

and filtering said second pulsating DC signal to develop a second steady DC coordinate signal $X = R \sin \phi$ 13. The method of aircraft navigation according to claim 12, and further comprising:

generating waypoint coordinate signals $X' = P \sin \theta$ and $Y' = P \cos \theta$ representative of the position of a waypoint relative to the source of said data signals;

and summing said waypoint coordinate signals with said steady DC coordinate signals to develop rectilinear coordinate position signals
$X'' = R \sin \phi + P \sin \theta$ and
$Y'' = R \cos \phi + P \cos \theta$.

14. The method of aircraft navigation according to claim 13, and further comprising:

rotating said rectilinear coordinate position signals to resolve cross track and along track signal information for instrument display.

* * * * *